(12) United States Patent
Breen et al.

(10) Patent No.: US 8,955,364 B2
(45) Date of Patent: Feb. 17, 2015

(54) PILOT ASSEMBLY WITH PRESS FIT INSERT/BODY CONSTRUCTION AND METHOD FOR METAL FORMING DIES

(71) Applicant: Standard Lifters, Inc., Grand Rapids, MI (US)

(72) Inventors: Scott M. Breen, Marne, MI (US); Joel T. Pyper, Grand Rapids, MI (US)

(73) Assignee: Standard Lifters, Inc., Grand Rapids, MI (US)

( * ) Notice: Subject to any disclaimer, the term of this patent is extended or adjusted under 35 U.S.C. 154(b) by 0 days.

(21) Appl. No.: 14/101,743

(22) Filed: Dec. 10, 2013

(65) Prior Publication Data

US 2014/0157857 A1    Jun. 12, 2014

Related U.S. Application Data

(60) Provisional application No. 61/735,103, filed on Dec. 10, 2012.

(51) Int. Cl.
*B21D 45/00* (2006.01)
*B21D 45/06* (2006.01)
*B23P 15/24* (2006.01)
*B21D 28/34* (2006.01)

(52) U.S. Cl.
CPC ............. *B23P 15/24* (2013.01); *B21D 28/34* (2013.01)
USPC ................................. 72/344; 72/404; 72/427

(58) Field of Classification Search
CPC ........ B21D 43/04; B21D 43/05; B21D 45/00; B21D 45/003; B21D 45/006; B21D 45/02; B21D 45/06; B21D 45/10
USPC .............. 72/344, 345, 346, 404, 405.01, 426, 72/427, 446, 448; 83/126, 128, 142, 143
See application file for complete search history.

(56) References Cited

U.S. PATENT DOCUMENTS 3,620,113 A * 11/1971 Gargrave ..................... 83/98
3,938,794 A *  2/1976 Stevens et al. ............ 267/130

(Continued)

FOREIGN PATENT DOCUMENTS

JP    56084130    9/1981
JP    56122634    9/1981

(Continued)

OTHER PUBLICATIONS

Standard Lifters Inc., "Pilot Assembly," sales brochure, publication date Oct. 2011, 15 pages total, Grand Rapids, Michigan, USA.

(Continued)

*Primary Examiner* — Edward Tolan
(74) *Attorney, Agent, or Firm* — Price Heneveld LLP (57) ABSTRACT

A pilot assembly and method has a cylindrical pilot body with a pilot insert having tapered outer end. The pilot assembly has at least one inwardly curved sidewall relief, as well as internally mounted reciprocating ejector pins with outer ends that protrude through holes in the outer body end to strip stock from the pilot. A spring has its outer end mounted in the groove in the pilot body, and an inner end attached to the inner end of the pilot insert in a pre-tensed condition. A cap screw has an enlarged head that has at least a portion thereof fit into the pilot sidewall relief, and a threaded shank that anchors the pilot in an associated die member.

40 Claims, 6 Drawing Sheets

(56) References Cited

U.S. PATENT DOCUMENTS

| | | | | |
|---|---|---|---|---|
| 4,118,968 | A | * | 10/1978 | Ames ............................... 72/328 |
| 4,282,736 | A | * | 8/1981 | Mashburn ....................... 72/345 |
| 4,342,214 | A | | 8/1982 | Neuendorf |
| 4,516,449 | A | * | 5/1985 | Boyette ........................... 83/140 |
| 4,644,836 | A | | 2/1987 | Wepner |
| 4,646,599 | A | * | 3/1987 | Benedict ......................... 83/131 |
| 4,916,931 | A | | 4/1990 | Kaeseler |
| 5,359,914 | A | * | 11/1994 | Brown ............................. 83/139 |
| 5,860,315 | A | | 1/1999 | Sawdon |
| 7,581,475 | B2 | * | 9/2009 | Moellering ...................... 83/143 |
| 2005/0241360 | A1 | | 11/2005 | Miller et al. |
| 2013/0255350 | A1 | * | 10/2013 | Schneider et al. .............. 72/427 |

FOREIGN PATENT DOCUMENTS

| | | |
|---|---|---|
| JP | 57100825 | 6/1982 |
| JP | 06142788 | 5/1994 |
| KR | 1020010069897 | 7/2001 |
| KR | 1020060104028 | 10/2006 |
| KR | 100766072 | 10/2007 |
| SU | 389870 A | 7/1973 |
| SU | 1061886 A | 12/1983 |
| SU | 1822811 A1 | 6/1993 |

OTHER PUBLICATIONS

Standard Lifters Inc., "Pilot Sleeve," sales brochure, publication date Jan. 2012, 18 pages total, Grand Rapids, Michigan, USA.

* cited by examiner

PILOT ASSEMBLY WITH PRESS FIT INSERT/BODY CONSTRUCTION AND METHOD FOR METAL FORMING DIES

CROSS REFERENCE TO RELATED APPLICATIONS AND CLAIM TO PRIORITY

The present application is related to commonly assigned, U.S. provisional patent application Ser. No. 61/735,103, filed Dec. 10, 2012, entitled PILOT ASSEMBLY WITH PRESS FIT INSERT/BODY CONSTRUCTION AND METHOD FOR METAL FORMING DIES, which is incorporated herein by reference, and claims priority thereto under 35 U.S.C. §119.

BACKGROUND OF THE INVENTION

The present invention relates to metal forming dies and the like, and in particular to a shoulder pilot assembly with self-contained stripper and associated method.

Metal forming dies, such as stamping dies and the like, are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming processes have typically been individually designed, one of a kind assemblies for a particular part, with each of the various components being handcrafted and custom mounted or fitted in an associated die set, which is in turn positioned in a stamping press. Not only are the punches and the other forming tools in the die set individually designed and constructed, but the other parts of the die set, such as stock lifters, guides, end caps and keepers, cam returns, pilots, etc. are also custom designed, and installed in the die set. Current die making processes require carefully machined, precision holes and recesses in the die set for mounting the individual components, such that the same are quite labor intensive, and require substantial lead time to make, test and set up in a stamping press. Consequently, such metal forming dies are very expensive to design, manufacture, and repair or modify.

Pilot assemblies, such as that disclosed in U.S. Pat. No. 4,342,214, are used for locating a work piece in successive forming stages of a machine, such as a punch press, where the work piece is progressively moved through the forming stages of the machine. The pilot assembly typically includes a pilot pin mounted to a movable die member of the machine for guiding entry into a previously formed hole in a work piece or in a companion die member as the die members are moved toward each other, the pin being axially retractable in its mounting in the event that it strikes an obstruction. The retraction movement of the pin may be controlled by a spring or a hydraulic mechanism which includes a hydraulic chamber formed behind the pin into which the pin moves to displace a hydraulic fluid therefrom.

Figure 5:
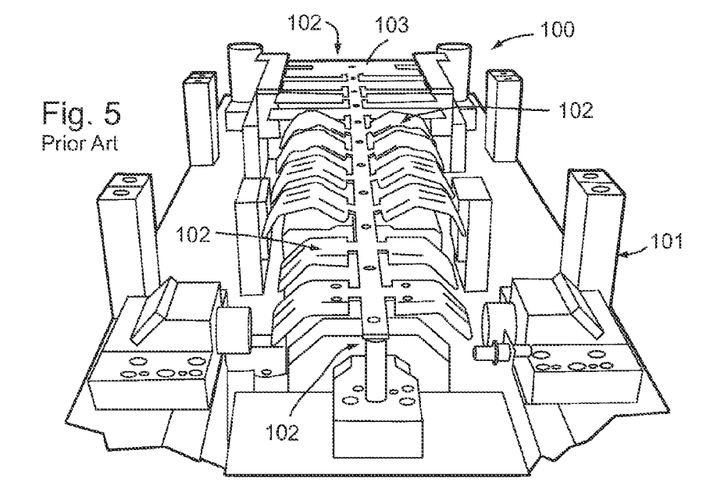
FIG. 5 is a partially schematic perspective view of a representative, prior art die member shown in an open condition with a stock strip positioned along the various work stations of the die member.
Figure 6:
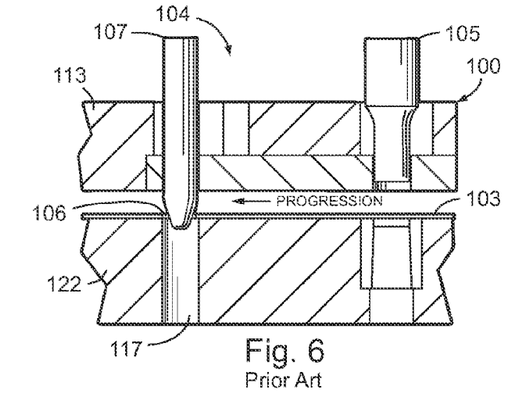
FIG. 6 is a partially schematic cross-sectional view of a prior art pilot assembly.

FIGS. 5-8 illustrate several well known prior art metal forming dies and associated pilot mechanisms, which further represent the background of the present invention. For example, FIG. 5 illustrates one half of a die set 100, which includes a first die member 101 having a plurality of longitudinally spaced apart work stations 102 at which various bending, forming, cut-off and/or punching operations are performed on an elongate strip of metal stock 103. As best illustrated in FIG. 6, the prior art pilot mechanism 104 for the illustrated die set 100 includes a pierce tool punch 105 located at an upstream portion of stock strip 103, which, in the illustrated example, forms a vertically oriented through hole 106 in the stock strip 103 at regularly spaced apart intervals along the stock strip. The through holes or pilot holes 106 are selectively engaged by a series of pilot pins 107 positioned on at least selected ones of the die work stations 102, which serve to precisely locate the stock strip 103 in the work stations, and retain the same in place during the metal forming stroke of the die tools. After each metal forming stroke of the die tools, the pilot pins 107 are retracted out of their associated pilot holes 106 in the stock strip 103, and the stock strip is then shifted longitudinally to the next adjacent work station 102, until the metal part has been completely formed and cut off of the stock strip. When the pilot pins 107 are retracted out of the pilot holes 106 in the stock strip 103, the stock strip tends to stick on one or more of the pilot pins, thereby requiring some type of stripper mechanism to separate them, such that the stock strip can be quickly and sequentially advanced longitudinally through the various die stations.

Figure 7:
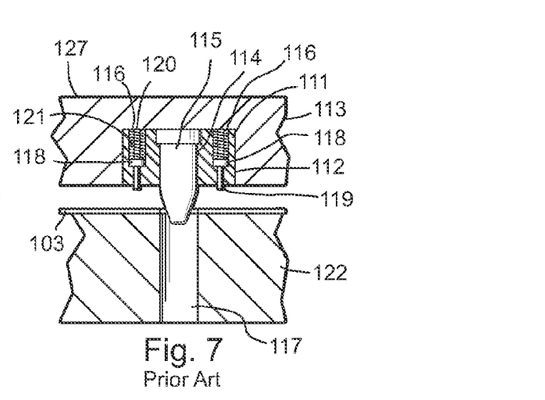
FIG. 7 is a partially schematic cross-sectional view of another prior art pilot assembly.

FIG. 7 illustrates another known prior art pilot assembly that includes a rectangularly shaped block or base 111 that is mounted in a blind hole pocket 112 in an associated upper die member 113. The base block 111 includes a central aperture 114 in which a pilot pin 115 is retained, and two laterally offset reaction apertures 116 in which a pair of stripper assemblies are received and retained. A female punch tool 117 is positioned in the lower die member 122, and closely receives the pilot pin 115 to precisely locate the stock strip 5 in the associated work station 112. Each of the stripper assemblies comprises a plunger shaped rod 118 having an outer end 119 protruding outwardly from base block 111 toward the stock strip 103, and an inner end 120 with a coil spring 121 received thereover which resiliently urges the rods 118 outwardly on opposite sides of pilot pin 15, and serve to strip the stock strip 103 from the exterior surface of the pilot pin 115 as the pilot pin and associated upper die member 113 are raised to a diverged condition relative to the lower die member 122.

Figure 8:
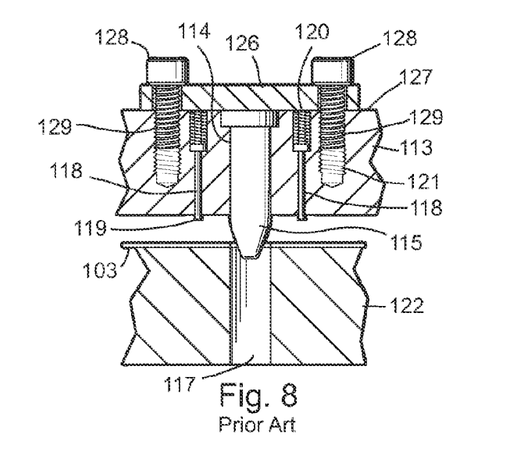
FIG. 8 is a partially schematic cross-sectional view of yet another prior art pilot assembly.
Figure 9:
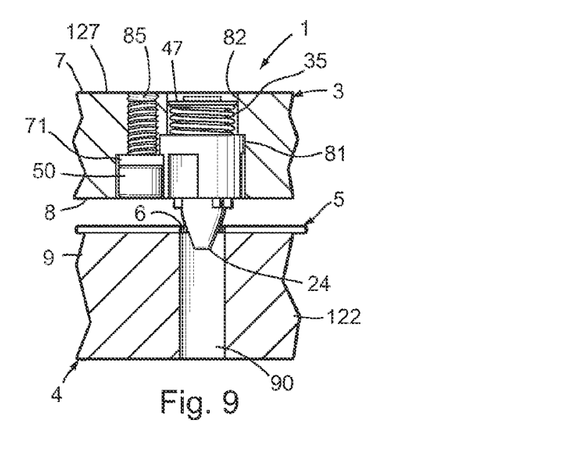
FIG. 9 is a cross-sectional view of the pilot assembly embodying the present invention, shown installed in a die set.
Figure 10:
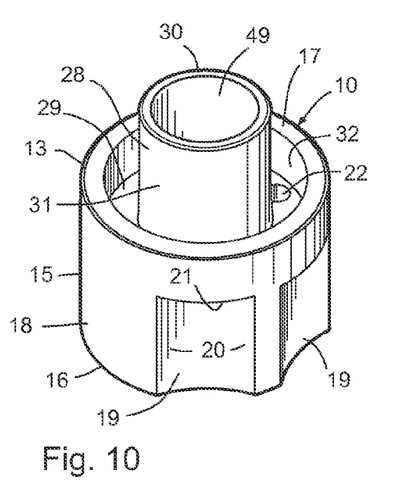
FIG. 10 is a perspective view of a pilot portion of the pilot assembly, taken from an inner end thereof.
Figure 11:
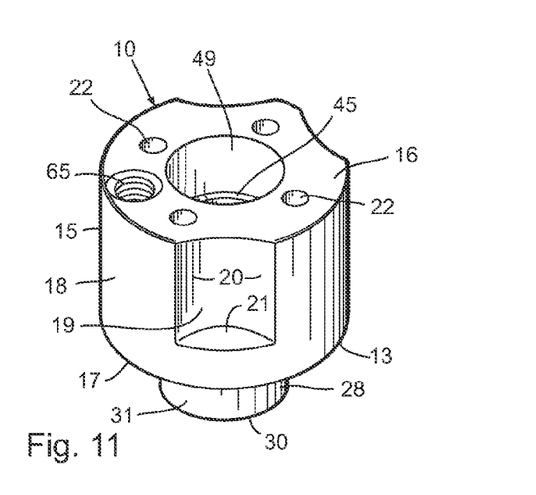
FIG. 11 is a perspective view of the pilot, taken from an outer end thereof.

FIG. 8 illustrates yet another known prior art pilot assembly, which includes an enlarged, flat mounting plate 126 which attaches to the upper surface 127 of the upper die member 113 using a pair of cap head screws 128 having threaded shanks 129 that are anchored in the upper die member 113. The upper die member 113 includes a central aperture 114 in which a pilot pin 115 is received and retained, along with a pair of reaction apertures 116 disposed on opposite sides of pilot pin 115, each of which receives and retains therein a plunger shaped rod 118. The outer ends 119 of the rods 118 protrude outwardly from the lower surface of upper die member 113, while the inner ends 120 of rods 118 have coil springs 121 received thereon which resiliently urge rods 118 outwardly, such that the outer ends 119 of rods 118 serve to strip the stock strip 5 away from the exterior surface of the pilot pin 115, and thereby permit the stock strip 5 to be shifted longitudinally into the next adjacent work station.

While such prior pilot assemblies have proven generally successful, they are rather expensive and time consuming to construct and install in an associated die set, such that further improvements and enhancements to the same, as well as metal forming dies generally, would be clearly advantageous, and are disclosed herein.

SUMMARY OF THE INVENTION

One aspect of the present invention is a multi-station progressive metal forming die having at least two mutually converging and diverging die members between which an elongate stock strip is shifted longitudinally to form parts from the stock strip, with an improved modular pilot assembly having a self-contained stripper for precisely locating the stock strip in the die stations. The modular pilot assembly includes a pilot body operably supported on one of the die members and having a generally cylindrical shape with an outer end portion oriented toward the stock strip, an oppositely disposed inner end portion oriented away from the stock strip, and a central aperture extending through the outer and inner end portions. The outer end portion of the pilot body has an outer end surface oriented toward the stock strip, an inner end surface oriented away from the stock strip, and an outer sidewall with a least one fastener relief therein having an arcuately shaped, radially inwardly curved relief sidewall that extends axially from the outer end surface to a relief end surface facing toward the stock strip and spaced axially outwardly a predetermined distance from the inner end surface, as well as at least one axially oriented ejector pin aperture which extends through the outer end surface and opens generally to the inner end surface. The inner end portion of the pilot body has a generally annularly shaped spring retainer collar, with an outer end oriented toward the stock strip, an inner end oriented away from the stock strip, and an outer sidewall with a diameter that is less than the diameter of the outer sidewall of the outer end portion of the pilot body. The pilot assembly also includes a pilot insert having at least a portion thereof shaped for press fit reception in the central aperture of the pilot body in an assembled condition. The pilot insert includes a circularly shaped innermost collar portion disposed adjacent the outer end surface of the pilot body when in the assembled condition and shaped for close reception in a pilot hole in the stock strip. The pilot insert also includes a generally tapered outer portion configured to engage the pilot hole in the stock strip and guide the stock strip to a predetermined position in an associated die forming station. The pilot insert also has a base portion positioned opposite the tapered outer portion. The pilot assembly includes at least one rigid ejector pin slidingly received and retained in the ejector pin aperture in the pilot body, having an inner end oriented away from the stock strip and an outer end oriented toward the stock strip and protruding outwardly from the outer end surface of the outer end portion of the pilot body when urged to an extended position to contact the stock strip and strip the same away from the pilot insert, and retracting inwardly toward the pilot body when urged to a retracted position. The pilot assembly includes a spring member having a generally hollow interior that is received onto and over the spring retainer collar on the inner end portion of the pilot body. The spring member has an outer end oriented toward the stock strip, operably engaging the inner end of the ejector pin to bias the ejector pin outwardly to the extended position, and an inner end oriented away from the stock strip and positioned adjacent to the base portion of the pilot insert in the assembled condition. The pilot assembly includes a retainer operably connected with the base portion of the pilot insert, and engaging the inner end of the spring member to retain the spring member in a pre-tensed condition on the spring retainer collar when in the assembled condition to resiliently urge the ejector pin to the extended position. The pilot assembly also includes a mounting screw having an enlarged head portion with a circular plan shape that is at least partially, closely received in the fastener relief in the outer end portion of the pilot body, an annularly shaped inner face oriented away from the stock strip and abuttingly engaging the relief end surface of the fastener relief in the outer end portion of the pilot body. The mounting screw includes a threaded shank portion anchored in the one die member to securely, yet detachably mount the pilot assembly on the one die member in a manner which causes the ejector pin to automatically reciprocate between the retracted and extended positions relative to the pilot body during operation of the metal forming die to insure that the stock strip is consistently stripped away from the pilot insert.

Yet another aspect of the present invention is a modular pilot assembly with self-contained stripper for multi-station progressive metal forming dies having at least two mutually converging and diverging die members between which an elongate stock strip is shifted longitudinally to form parts from the stock strip. The modular pilot assembly includes comprising a pilot body configured for operable support on an associated die member, having a generally cylindrical shape with an outer end portion oriented toward the stock strip, an oppositely disposed inner end portion oriented away from the stock strip, and a central aperture extending through the outer and inner end portions. The outer end portion of the pilot body has an outer end surface oriented toward the stock strip, an inner end surface oriented away from the stock strip, and an outer sidewall with a least one fastener relief therein having an arcuately shaped, radially inwardly curved relief sidewall that extends axially from the outer end surface to a relief end surface facing toward the stock strip and spaced axially outwardly a predetermined distance from the inner end surface, as well as at least one axially oriented ejector pin aperture which extends through the outer end surface and opens generally to the inner end surface. The inner end portion of the pilot body has a generally annularly shaped spring retainer collar, with an outer end oriented toward the stock strip, an inner end oriented away from the stock strip, and an outer sidewall with a diameter that is less than the diameter of the outer sidewall of the outer end portion of the pilot body. The pilot assembly includes a pilot insert having at least a portion thereof shaped for press fit reception in the central aperture of the pilot body in an assembled condition. The pilot insert includes a circularly shaped innermost collar portion disposed adjacent the outer end surface of the pilot body when in the assembled condition and shaped for close reception in a pilot hole in the stock strip, a generally tapered outer portion configured to engage the pilot hole in the stock strip and guide the stock strip to a predetermined position in an associated die forming station, and a base portion positioned opposite the tapered outer portion. The pilot assembly also includes at least one rigid ejector pin slidingly received and retained in the ejector pin aperture in the pilot body, having an inner end oriented away from the stock strip and an outer end oriented toward the stock strip and protruding outwardly from the outer end surface of the outer end portion of the pilot body when urged to an extended position to contact the stock strip and strip the same away from the pilot insert, and retracting inwardly toward the pilot body when urged to a retracted position. The pilot assembly also includes a spring member having a generally hollow interior that is received onto and over the spring retainer collar on the inner end portion of the pilot body. The spring member has an outer end oriented toward the stock strip, operably engaging the inner end of the ejector pin to bias the ejector pin outwardly to the extended position, and an inner end oriented away from the stock strip positioned adjacent to the base portion of the pilot insert in the assembled condition. The pilot assembly includes a retainer operably connected with the base portion of the pilot insert, engaging the inner end of the spring member to retain the spring member in a pre-tensed condition on the spring retainer collar when in the assembled condition to resiliently urge the ejector pin to the extended position. The pilot assembly also includes a mounting screw having an enlarged head portion with a circular plan shape that is at least partially, closely received in the fastener relief in the outer end portion of the pilot body, an annularly shaped inner face oriented away from the stock strip and abuttingly engaging the relief end surface of the fastener relief in the outer end portion of the pilot body. The mounting screw includes a threaded shank portion shaped for anchoring in the associated die member to securely, yet detachably mount the pilot assembly on the associated die member in a manner which causes the ejector pin to automatically reciprocate between the retracted and extended positions relative to the pilot body during operation of the metal forming die to insure that the stock strip is consistently stripped away from said pilot insert.

Yet another aspect of the present invention is a method for making a multi-station progressive metal forming die having at least two mutually converging and diverging die members between which an elongate stock strip is shifted longitudinally to form parts from the stock strip, with the improvement of at least one modular pilot with self-contained stripper for precisely locating the stock strip in the die stations. The method includes forming a pilot body for operable support on one of the die members with a generally cylindrical shape having an outer end portion oriented toward the stock strip, an oppositely disposed inner end portion oriented away from the stock strip, and a central aperture extending through the outer and inner end portions. The method further includes forming the outer end portion of the pilot sleeve with an outer end surface oriented toward the stock strip, an inner end surface oriented away from the stock strip, and an outer sidewall with a least one fastener relief therein having an arcuately shaped, radially inwardly curved relief sidewall that extends axially from the outer end surface to a generally flat arcuately shaped relief end surface facing toward the stock strip and spaced axially outwardly a predetermined distance from the inner end surface, as well as at least one axially oriented ejector pin aperture which extends through the outer end surface and opens generally to the inner end surface. The method further includes forming the inner end portion of the pilot body with a generally annularly shaped spring retainer collar, having an outer end oriented toward the stock strip, an inner end oriented away from the stock strip, and an outer sidewall with a diameter that is less than the diameter of the outer sidewall of the outer end portion of the pilot body. The method further includes forming a rigid pilot insert with a medial portion shaped for close reception in the central aperture of the pilot body in an assembled condition, a tapered outer portion configured to engage the pilot hole in the stock strip and guide the stock strip to a predetermined position in an associated one of the die forming stations, and an inner base portion positioned opposite the tapered outer portion. The method also includes hardening the pilot insert prior to assembly in the pilot body. The method includes press fitting the hardened pilot insert into the central aperture of the pilot body such that the tapered outer portion of the pilot insert protrudes outwardly from the outer end surface of the outer end portion of the pilot body to define an assembled condition. The method further includes forming at least one rigid ejector pin with an inner end, and an outer end configured to protrude outwardly from the outer end surface of the outer end portion of the pilot body when urged to an extended position to contact the stock strip, and to retract toward the pilot body when urged to a retracted position. The method also includes inserting the ejector pin into the ejector pin aperture in the pilot body, such that the ejector pin is slidingly received and retained in the ejector pin aperture for longitudinal reciprocation therein between the extended and retracted positions. The method includes selecting a spring member with a generally hollow interior, an outer end oriented toward the stock strip, and an opposite inner end oriented away from the stock strip. The method also includes positioning the hollow interior of the spring member onto and over the spring retainer collar of the inner end portion of the pilot body, with the outer end of the spring member abutting the inner end of the ejector pin, and the inner end of the spring member protruding inwardly away from the outer end portion of the pilot sleeve. The method includes operably connecting a retainer with the base portion of the pilot insert at a location thereon which engages the retainer with the inner end of the spring member and retains the spring member in a pre-tensed condition on the spring retainer collar in an assembled condition to resiliently urge the ejector pin to the extended position. The method includes forming a non-threaded, blind hole pocket in a mounting face of one of the die members with a cylindrical sidewall shaped to closely receive and retain at least the outer end portion of the pilot body therein. The method also includes forming a threaded mounting screw aperture in the mounting face of the one die member at a location spaced laterally apart from the pilot pocket a predetermined distance. The method further includes inserting the pilot in the assembled condition into the pilot pocket in the one die member with at least the outer sidewall of the outer end portion of the pilot body closely received therein, so as to accurately locate the pilot on the one die member, and with the fastener relief in the pilot body facing and aligned with the mounting screw aperture in the one die member. The method also includes selecting a mounting screw having an enlarged head portion with a circular plan shape sized for close reception of at least a portion thereof in the fastener relief in the pilot body, an annularly shaped inner face sized for abutting engagement with at least a portion of the relief end surface of the fastener relief in the pilot body, and a threaded shank portion. The method includes inserting the threaded shank portion of the mounting screw axially into the mounting screw aperture in the mounting face of the one die member, such that at least a portion of the enlarged head portion of the mounting screw is closely received in the fastener relief and adjacent the relief sidewall on the outer end portion of the pilot body. The method further includes tightening the mounting screw in the mounting screw aperture in the one die member, thereby abuttingly engaging the inner face of the mounting screw head portion securely against the relief end surface of the fastener relief in the outer end portion of the pilot body to securely, yet detachably mount the pilot on the one die member in a manner which causes the ejector pin to automatically reciprocate between the retracted and extended positions relative to the pilot body during operation of the metal forming die to insure that the stock strip is consistently stripped away from the pilot insert.

Yet another aspect of the present invention is a pilot assembly that can be easily installed in an associated die member by simple machining a single pocket and a single threaded retainer hole therein. The pilot assembly has a self-contained stripper with no loose parts or pieces, is constructed from fewer components than prior art pilot devices, and positively prevents the stock strip from sticking to the pilot. The pilot body itself provides the precise location of the stripper assembly in an associated die pad at a location close to the stock strip. The stripper assembly has a modular design that can be economically manufactured, a small profile and footprint, and can be easily assembled and disassembled from an associated die member. Due to the design of the pilot assembly, the ejector pins can be located in close proximity to the tip of the pilot assembly, so as to positively and dependably, repeatedly strip the stock strip from the pilot. The pilot assembly has a single screw mounting system for quick and easy installation in an associated die member. The pilot body can be machined from a single piece of solid material in one setup to achieve tighter tolerances and reduced manufacturing costs. The pilot insert can also be machined from a single piece of solid material and can be hardened to achieve tighter tolerances, improved wear resistance, as well as reduced manufacturing costs. The pilot assembly is efficient in use, economical to manufacture, capable of a long operating life, and particularly well adapted for the proposed use.

These and other advantages of the invention will be further understood and appreciated by those skilled in the art by reference to the following written specification, claims, and appended drawings.

DETAILED DESCRIPTION OF THE PREFERRED EMBODIMENTS

Figures 1, 2, 3, 3A, 4:
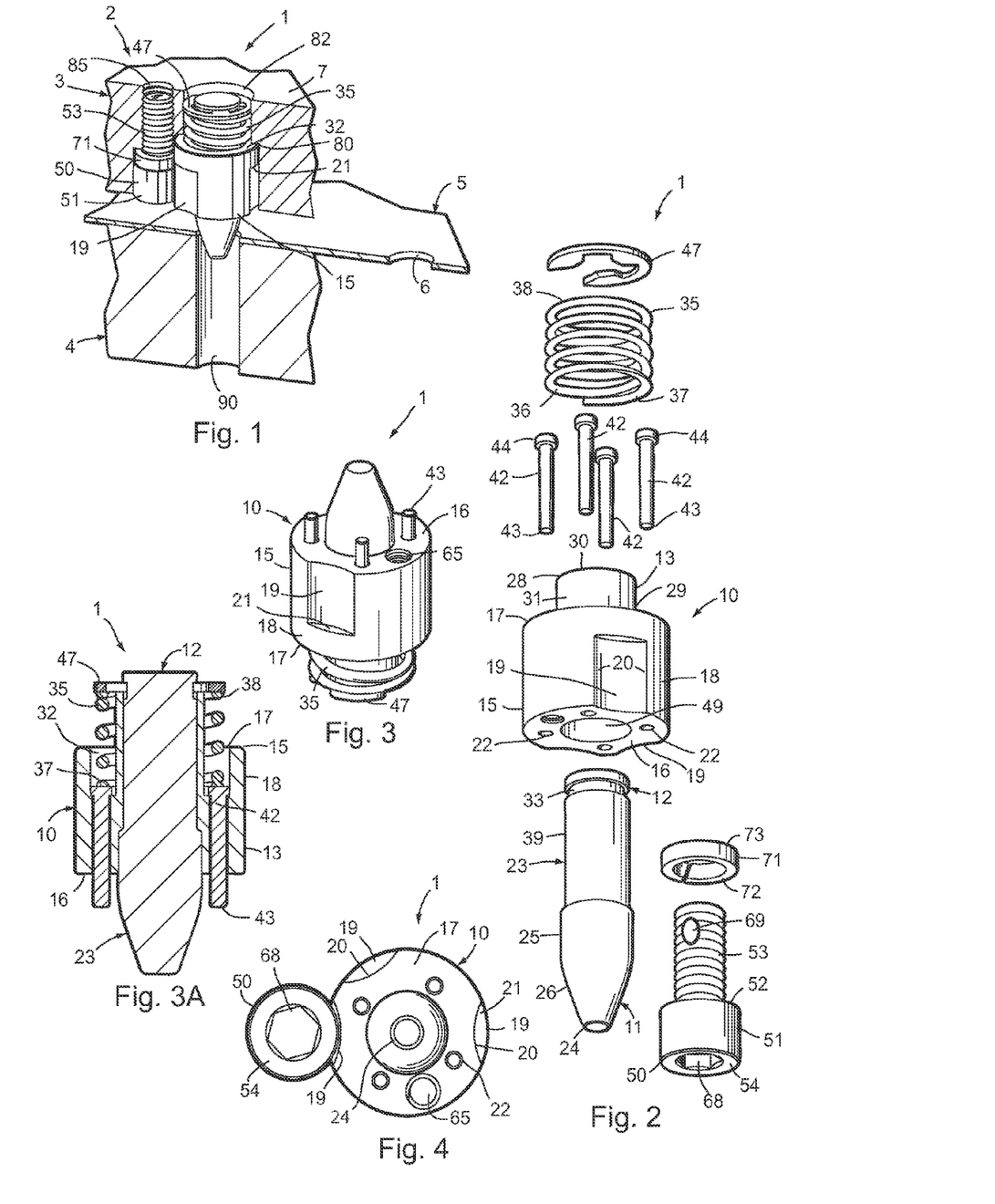
FIG. 1 is a perspective view of a modular pilot assembly with self-contained stripper embodying the present invention, shown installed in a die set carrying a stock strip in which pilot holes have been formed.
FIG. 2 is an exploded perspective view of the pilot assembly shown in FIG. 1.
FIG. 3 is a perspective view of a portion of the pilot assembly in an assembled condition, taken from an outer end thereof.
FIG. 3A is a vertical cross-sectional view of the portion of the pilot assembly shown in FIG. 3.
FIG. 4 is a top plan view of the pilot assembly.

For purposes of description herein, the terms "upper," "lower," "right," "left," "rear," "front," "vertical," "horizontal" and derivatives thereof shall relate to the invention as oriented in FIGS. 1, 2 and 3A. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1-4) generally designates a modular pilot assembly with self-contained stripper embodying the present invention. As shown in FIG. 1, the pilot assembly 1 is particularly adapted for use in conjunction with a multi-station progressive metal forming die 2 having at least two mutually converging and diverging die members 3 and 4 between which an elongate stock strip 5 is shifted longitudinally to form parts from the stock strip. The pilot assembly 1 includes a pilot body 10 configured for operable support on one of the two die members 3, 4 having an outer end portion 15 oriented toward the stock strip 5, and an oppositely disposed inner end portion 13 oriented away from the stock strip 5. The outer end portion 15 has a generally cylindrically shape, with an outer end surface 16 oriented toward the stock strip 5, and an inner end surface 17 oriented away from the stock strip 5. The outer end portion 15 has an outer sidewall 18 with at least one fastener relief 19 that has an arcuately shaped, radially inwardly curved relief sidewall 20 that extends from the closed outer end 16 to a generally flat, arcuately shaped relief end surface 21 facing toward the stock strip 5 and spaced axially a predetermined distance from the inner end 17. The outer end portion 15 also has at least one axially extending ejector pin aperture 22 which opens through the outer end surface 16 and into the inner end 17. The inner end portion 13 of the pilot body 10 has a cylindrically shaped spring retainer rod portion 28 on the pilot body 10, having an inner end 30 oriented away from the stock strip 5, and an outer sidewall 31 with a diameter that is less than the diameter of the outer sidewall 18 of the outer end portion 15, thereby forming an annularly shaped spring groove 32 (FIGS. 1, 3A, and 10) with a lower surface 29 that is adjacent the inner end of spring retainer rod portion 28. A pilot insert aperture 49 is formed in the pilot body 10 as shown in FIGS. 2, and 10-14.

Figure 18:
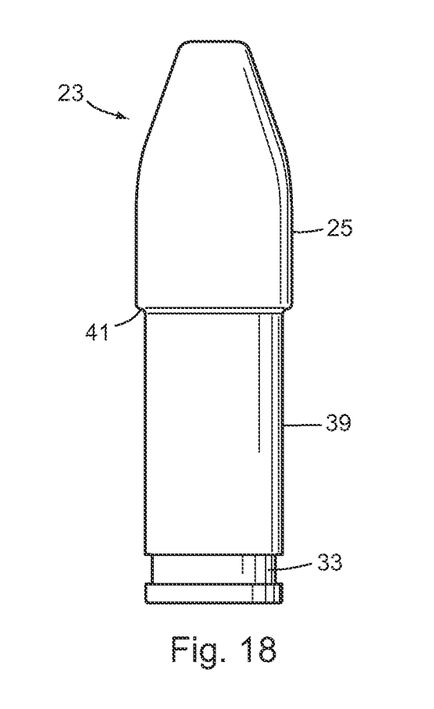
FIG. 18 is a side elevational view of the pilot insert.
Figure 19:
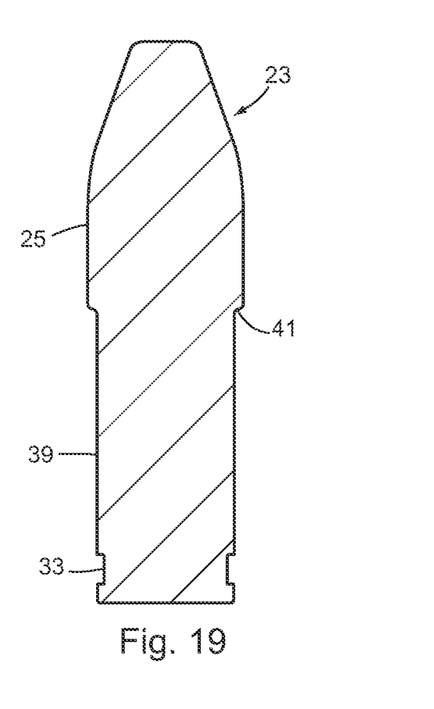
FIG. 19 is a vertical cross-sectional view of the pilot insert shown in FIGS. 15-18, taken along the line XIX-XIX shown in FIG. 17.

The pilot assembly 1 also includes a pilot insert 23 (FIGS. 2 and 15-19) with an outer end portion 11 and an inner end portion 12. The outer end portion 11 has a generally tapered point portion 24 and a circularly shaped collar portion 25. The inner end portion 12 has a generally cylindrical shape with collar portion 39. The outer sidewalls of the collar portion 25 have a diameter greater than the inner end 12 collar portion 39, thereby forming a shoulder 41 as shown in FIGS. 15 and 17-19. The shoulder 41 can be flat or slightly rounded as shown in FIGS. 18 and 19. A rounded shoulder can help to transfer some of the directional force that is generated against the pilot insert 23, when the die members converge, in a direction that is outward from the direction of the convergence. The outer end portion 11 of the pilot insert 23 is shaped for close reception in a pilot hole 6 in the stock strip 5, and a generally frusto-conically shaped outer portion or nose 26 configured to engage the pilot hole 6 in the stock strip 5 and guide the same to a predetermined position in an associated die forming station 12 of metal forming die 2. A retainer groove 33 is formed in the collar portion 39 of the inner end portion 12 of the pilot insert 23.

The pilot insert 23 is shaped to fit within the aperture 49 in the pilot body 10. The collar portions 25 and 39 of the pilot insert 23 are shaped to be press fit into the aperture 49 of the pilot body 10 such that the outer walls of each collar portion 25, 39 closely contact the inner walls of the aperture 49. When the pilot insert 23 is fully inserted into the pilot body 10, the shoulder 41 on the pilot insert 23 will abut a shoulder 45 formed within the aperture 49.

Figures 20, 21, 22, 23, 24, 25, 26, 27, 28, 29, 30, 31:
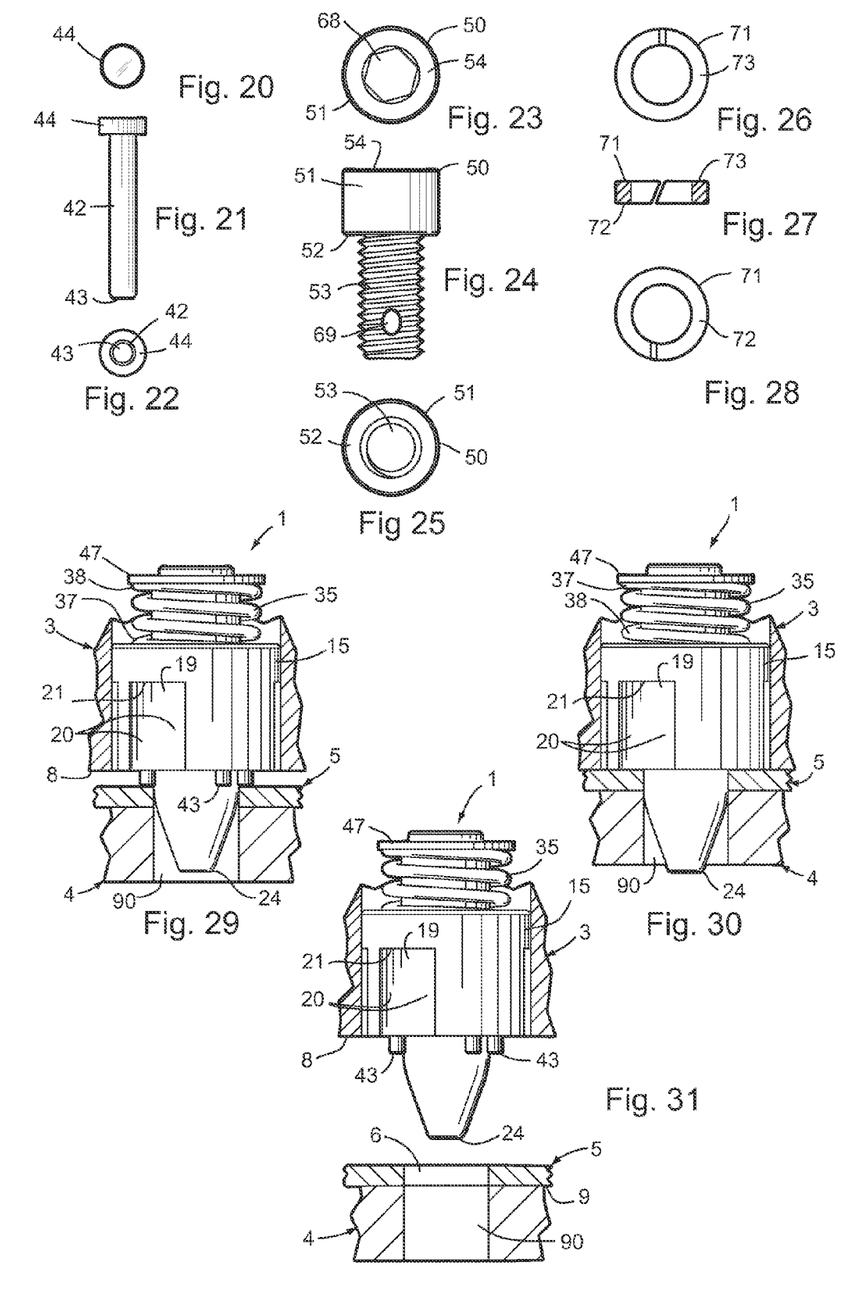
FIG. 20 is a top plan view of an ejector pin portion of the pilot assembly.
FIG. 21 is a side elevational view of the ejector pin.
FIG. 22 is a bottom plan view of the ejector pin.
FIG. 23 is a top plan view of a mounting screw portion of the pilot assembly.
FIG. 24 is a side elevational view of the mounting screw.
FIG. 25 is a bottom plan view of the mounting screw.
FIG. 26 is a top plan view of a lock washer portion of the pilot assembly.
FIG. 27 is a vertical cross-sectional view of the lock washer.
FIG. 28 is a bottom plan view of the lock washer.
FIG. 29 is a side elevational view of the pilot shown mounted in a die member, wherein the outer end of the pilot is partially inserted into the pilot aperture of an associated stock strip.
FIG. 30 is a side elevational view of the pilot shown mounted in a die member, wherein the outer end of the pilot is fully inserted into the pilot aperture in the stock strip.
FIG. 31 is a side elevational view of the pilot assembly shown mounted in a die member, wherein the pilot and upper die member have been diverged from the stock strip and the lower die member.

Pilot assembly 1 also includes a spring member 35 having a generally hollow interior 36 received on and over the spring retainer rod portion 28 of the pilot body 10, an outer end 37 oriented toward stock strip 5 and received in the spring groove 32, and an opposite inner end 38 oriented away from the stock strip 5 and positioned adjacent to the retainer groove 33 in the pilot insert 23, when in at least a partially assembled condition. The pilot assembly 1 also includes at least one rigid ejector pin 42 slidingly received and retained in the ejector pin aperture 22 in the pilot body 10, and having an outer end 43 that protrudes outwardly from the outer end 16 of pilot body 10 when urged to an extended condition, as shown in FIGS. 3 and 3A, to abut the stock strip 5 and strip the same from the pilot body 10, and retracts when urged to a retracted position, as shown in FIG. 30, and an inner end 44 that operably engages the outer end 37 of spring member 35 and is thereby biased outwardly by the spring member 35 toward the extended condition.

The pilot assembly 1 also includes a retainer ring 47 detachably received in the retainer groove 33 in the pilot insert 23 and engaging the inner end 38 of the spring member 35 in a pre-tensed condition to bias the ejector pin 42 toward the extended condition. The pilot assembly also includes a mounting screw 50 having an enlarged head portion 51 with a circular plan shape that is at least partially, closely received in the fastener relief 19 in the body portion 15 of the pilot body 10, an annularly shaped inner face 52 oriented away from the stock strip 5 and abuttingly engaging the relief end surface 21 of the fastener relief 19 in the body portion 15 of pilot body 10, and a threaded shank portion 53 configured for anchoring in an associated die member 3, 4 to securely, yet detachably mount the pilot assembly 1 on the associated die member in a manner which causes the ejector pin 42 to automatically reciprocate between the retracted and extended positions relative to the pilot body 10 during operation of the metal forming die to ensure that the stock strip 5 is consistently and fully stripped away from the outer end portion 11 of pilot insert 23.

The term "die member," as used herein, refers to any portion of a metal forming die or die set, including, but not limited to, an upper die member or die shoe, a lower die member, and all other die components, whether stationary or reciprocating, including a reciprocating pressure pad, or the like. In the illustrated examples, the pilot assembly 1 is shown mounted in a reciprocating upper die pad 3 located above a lower stationary die shoe 4. However, as will be appreciated by those skilled in the art, pilot assembly 1 can be mounted in other types of die members and/or components in a variety of different positions and orientations, as necessary to precisely locate the stock strip 5 in the various workstations 102 of a metal forming die 100.

The illustrated pilot body 10 (FIGS. 10-14) has a one-piece construction formed from a solid bar of rigid material, such as metal or the like. Similarly, the pilot insert 23 has a one-piece construction and can be made of a different material than used for the pilot body 10. For example, the pilot insert 23 can be made of a hardened material, such as hardened steel. The material used for the pilot insert 23 can be hardened prior to and/or after the pilot insert 23 is machined. By making the pilot insert 23 as a separate piece than the pilot body 10, the pilot insert 23 can be replaced within the assembly 1 and can be made of a more sturdy material so that there is increased wear resistance for the portion of the pilot assembly 1 that is engaging the holes 6 in the stock strip 5. Since the illustrated pilot body 10 (FIGS. 10-14) has a one-piece construction formed from a solid bar of rigid material, such as metal or the like, preferably, all machining operations on the solid bar of rigid material are made during a single machine set-up, so as to achieve greater accuracy and consistency of the pilot body 10, as well as reduced manufacturing costs. Similarly, preferably all machining operations for the pilot insert 23 are made during a single machine set-up.

In the illustrated pilot assembly 1, the point portion 24 of pilot insert 23 is located concentric with body portion 10 and spring retainer rod portion 28. Furthermore, the pilot body 10 includes a plurality of fastener reliefs 19 having a substantially identical configuration and arranged in a circumferentially spaced apart pattern around the outer sidewall 18 of the pilot body 10 to facilitate mounting the pilot assembly 1 at various locations and orientations on one or more of the die members 3, 4. As best illustrated in FIG. 4, the illustrated pilot body 10 includes three fastener reliefs 19, two of which are disposed generally diametrically opposite one another, and the third of which is oriented at an angle of approximately 30°-40° from the fastener relief in which the mounting screw 50 is received in the illustration of FIG. 4.

Figure 12:
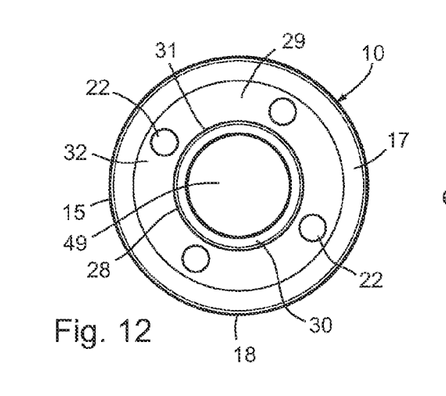
FIG. 12 is a plan view of the inner end of the pilot.
Figure 13:
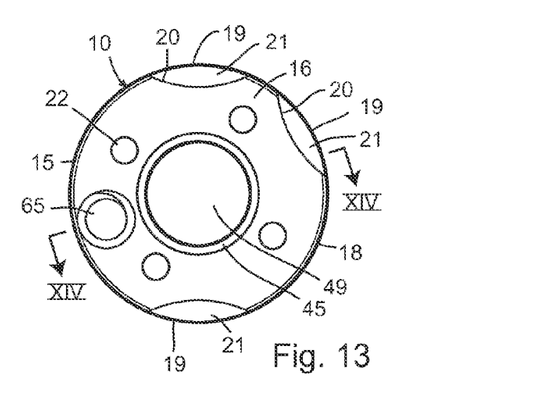
FIG. 13 is a plan view of the outer end of the pilot.

The illustrated pilot body 10 has a plurality of ejector pin apertures 22 having a substantially identical configuration and arranged in a circumferentially spaced apart, mutually parallel, axially extending pattern through the pilot body 10 to ensure effective and consistent stripping of the stock strip 5 from the point portion 24 of pilot insert 23. As best shown in FIGS. 4, 12 and 13, the illustrated pilot body 10 includes four ejector pin apertures 22 which are spaced opposite from one another on the outer end surface 16 of pilot body 10, and are radially positioned close to the collar portion 25 of pilot insert 23, so as to improve the stripping action of the same. The illustrated pilot assembly 1 also includes four substantially identical ejector pins 42 which are slidingly received and retained for reciprocation in the ejector pin apertures 22 of pilot body 10. While the illustrated embodiment shows four ejector pin apertures 22 and ejector pins 42, any number of associated pins 42 and aperture 22 can be used within the scope of the invention.

Figure 14:
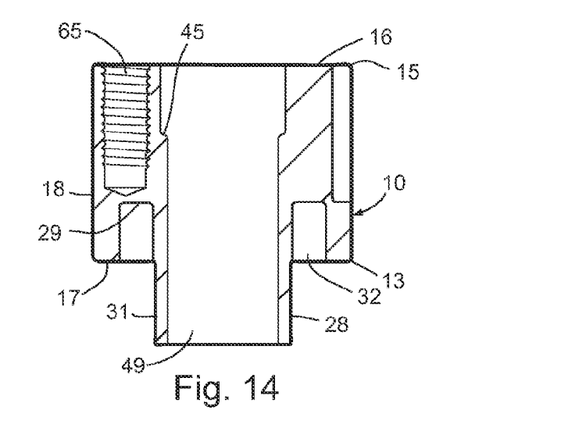
FIG. 14 is a vertical cross-sectional view of the pilot.
Figure 15:
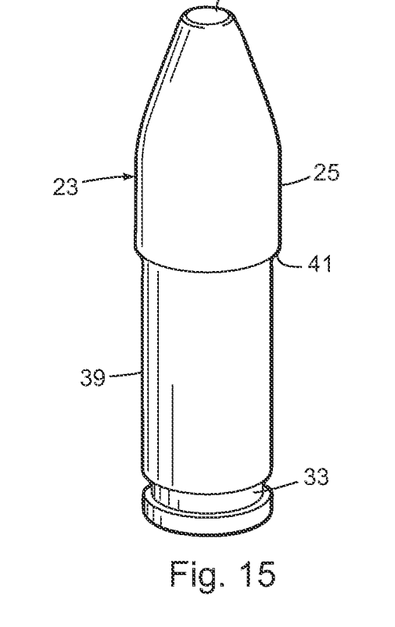
FIG. 15 is a perspective view of the pilot insert.
Figure 16:
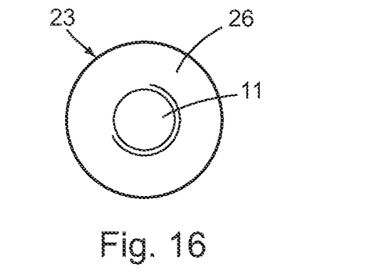
FIG. 16 is a top plan view of the pilot insert shown in FIG. 15.
Figure 17:
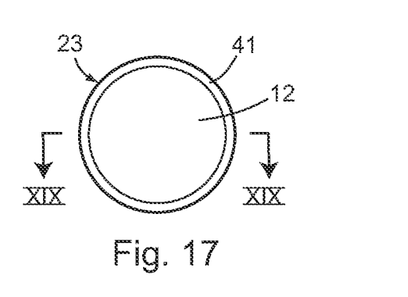
FIG. 17 is a bottom plan view of the pilot insert shown in FIG. 15.
Figures 32, 33, 34, 35, 36:
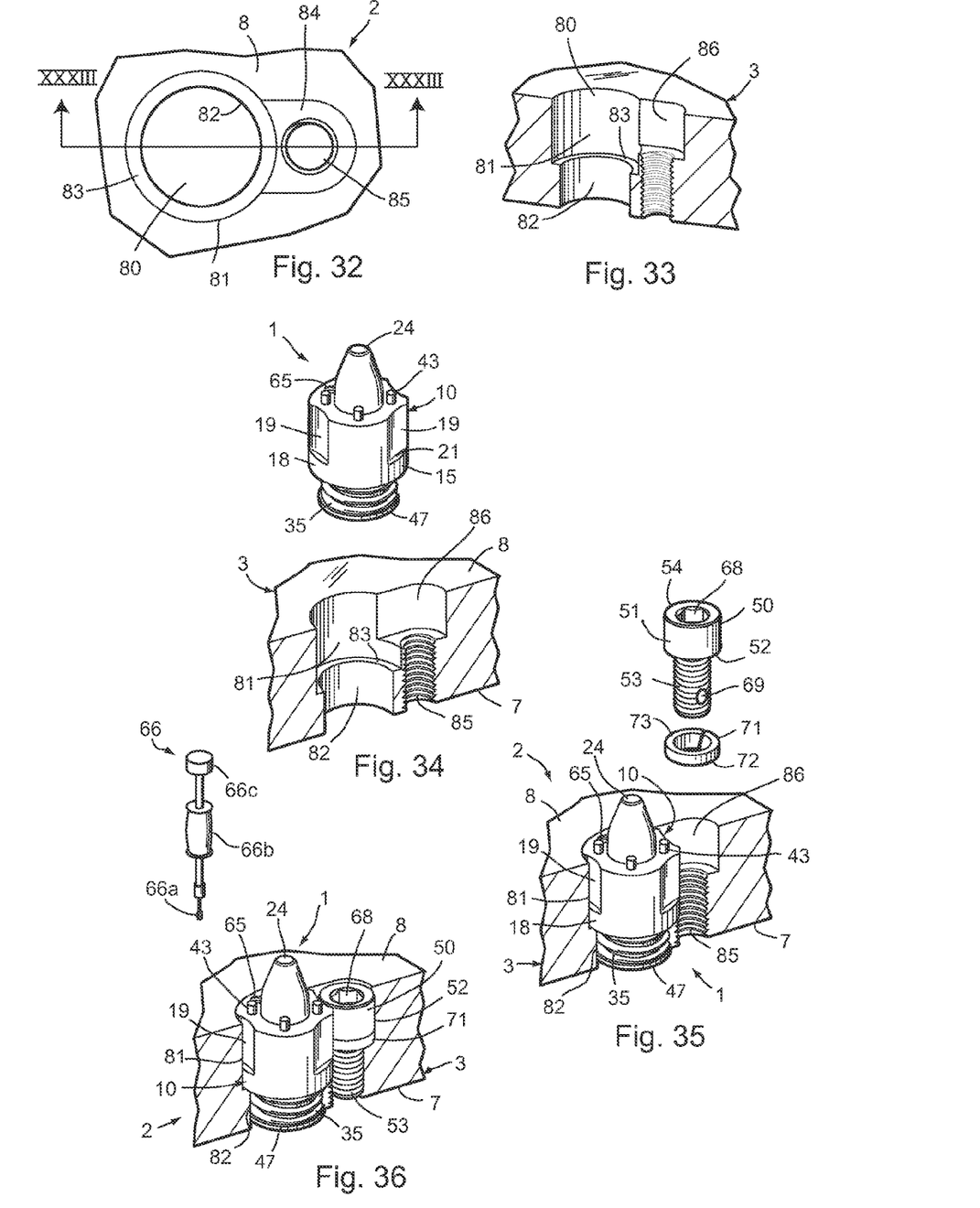
FIG. 32 is a plan view of an upper pressure pad portion of the die oriented with the normally lower mounting face oriented upwardly for illustration purposes, that has been machined for installation of the pilot assembly therein.
FIG. 33 is a perspective, cross-sectional view of the die member of FIG. 32, taken along the line XXXIII-XXXIII.
FIG. 34 is an exploded, perspective view of the pilot assembly prior to installation into the normally lower mounting face of the machined upper die pressure pad of FIGS. 32 and 33.
FIG. 35 is an exploded, perspective view of the pilot installed in the normally lower mounting face of the upper pressure pad die member of FIGS. 32-34, with the mounting screw and lock washer shown uninstalled.
FIG. 36 is a perspective view of the pilot assembly shown completely installed in the normally lower mounting face of the upper pressure pad die member of FIGS. 32-35.

As best illustrated in FIG. 22, the outer ends 43 of ejector pins 42 have a size and shape similar to the elongate body portions of ejector pins 42, each with a flat circular plan configuration best suited for abuttingly engaging the strip stock 5, while the inner ends 44 of ejector pins 42 are enlarged relative to the size of the elongate body portions of ejector pins 42, and define cylindrically shaped, enlarged heads, each with a generally circular, flat inner face which facilitates engagement with the outer end 37 of spring member 35. With reference to FIGS. 4 and 14, the illustrated pilot body 10 includes a threaded blind installation aperture 65 which extends axially into the outer end surface 16 of pilot body 10 at a location spaced radially outwardly from and circumferentially inbetween the ejector pin apertures 22. A puller tool 66, shown schematically in FIG. 36, is configured for threaded engagement in the blind installation aperture 65 to facilitate removal of the assembled pilot body 10 from the associated die member 3, 4, as discussed in greater detail below. Installation aperture 65 can be disposed generally opposite the three fastener reliefs 19 in pilot assembly 1, as best shown in FIG. 4.

The illustrated spring member 35 comprises a conventional closed coil spring, which may have partially flattened ground ends 37, 38 to more securely abut the inner ends 44 of ejector pins 42, as well as the retainer ring 47 mounted in the retainer groove 33 on the pilot insert 23. The illustrated retainer ring 47 comprises a conventional snap ring that is securely, yet detachably received and retained in retainer ring groove 33.

With reference to FIGS. 2, 25, 35 and 36, the illustrated mounting screw 50 comprises a conventional socket head cap screw having a tool engaging socket 68 in the outer face 54 of the head portion 51 of mounting screw 50, opposite inner face 52, and the threaded shank portion 53 includes a self-locking nylon patch 69, which prevents mounting screw 50 from inadvertently loosening from its tightened condition in the die member 3, 4.

In the illustrated example, a lock washer 71 (FIGS. 28, 35) is positioned over the threaded shank portion 53 of mounting screw 50, and further ensures that the mounting screw 50 will not become inadvertently loosened during operation of the metal forming die. The illustrated lock washer 71 is a conventional split, high-collar washer having a generally annular plan configuration with an outer face 72 abuttingly engaging the inner face 52 of the head portion 51 of mounting screw 50, and an inner face 73 engaging the relief end surface 21 of the fastener relief 19 on pilot body 10. Mounting screw 50 constitutes a single mounting screw system, configured for at least partial reception in and engagement with any one of the three fastener reliefs 19 in the pilot body 10, which provides the sole support for mounting the pilot body 10 in the die member 3,4, with a compact profile and footprint that facilitates ease of die design, operation and maintenance. The single mounting screw attachment of pilot body 10 to die member 3 also provides quick and easy installation and removal. As will be appreciated by those skilled in the art, pilot assembly 1 can be used either with or without lock washer 71.

Pilot assembly 1 is assembled by inserting four ejector pins 42 into the associated ejector pin holes 22 in the pilot body 10 with the enlarged circular outer ends or heads 44 oriented away from the stock strip 5. The spring member 35 is then inserted over the spring retainer rod portion 28 of pilot body 10, and into the spring groove 32, such that the outer end 37 of the spring member 35 abuts the inner ends 44 of the ejector pins 42. Spring member 35 is then compressed to a pre-tensed state, which permits insertion of the retainer ring 47 into the retainer ring groove 33 on the pilot insert 23, which contains the compressed spring member 35, and completes the assembly, such that spring member 35 biases each of the ejector pins 42 outwardly through the apertures 22 in the inner end 16 of pilot body 10 to a normally fully extended position. The threaded outer end of installation tool 66 is threadedly engaged in the threaded aperture 65 in pilot body portion 15 and serves to guide the pilot body 10 into pilot hole 80 in the correct orientation, as discussed in greater detail below.

With reference to FIGS. 33-36, the assembled pilot assembly 1 is quickly and easily installed in the illustrated upper die pad 3 in the following manner. The upper die pad 3 shown in FIGS. 33-36 is illustrated with the normally lower mounting face 8 oriented upwardly in a non-running condition, so as to better visualize the various pilot mounting apertures. However, as is apparent to those skilled in the art, pilot assembly 1 is typically mounted in the lower mounting face 8 of an upper pressure pad, or similar die component, and runs or operates in the orientation shown in FIGS. 1, 9 and 29-31. Initially, a non-threaded pilot aperture 80 is formed in the lower or mounting face 8, of the upper die member 3 using simple machining techniques and no special tooling, and is shaped to closely receive and retain the pilot body 10 therein. The illustrated pilot aperture 80 has a stepped construction, with a larger diameter aperture 81 disposed closest to the stock strip 5 and lower die mounting surface 8, and a smaller diameter aperture 82 disposed furthest away from the stock strip 5 and lower die mounting surface 8, with an annular lip or collar 83 formed therebetween. The outer sidewall 18 of the pilot body 10 fits closely within the larger aperture 81 of the pilot hole 80, and the inner end 17 of pilot body 10 engages collar 83 to axially locate pilot body 10 within pilot hole 80. The spring retainer rod portion 28 of pilot body 10, along with spring member 35 and retainer ring 47, are positioned in the smaller aperture 82 of the pilot hole 80. A single threaded mounting screw aperture 85 is formed in the lower or mounting face 8 of die member 3 at a location spaced laterally apart from the pilot hole 80 a predetermined distance, and is shaped to closely receive therein the shank portion 53 of mounting screw 50 and the lock washer 71. It is noteworthy that screw aperture 85 can be located at several different positions on the mounting face 8 of die member 3 to avoid interference with other die components mounted thereon, so long as it can be aligned with one of the three fastener reliefs 19 in the body portion 15 of pilot body 10, as shown in FIGS. 3, 3A and 34-36. A pocket 86 having a generally U-shaped plan configuration extends between and connects the threaded screw hole 85 and the larger pilot aperture 80 along the lower mounting face 8 of the upper pressure pad 3, and is sized to receive a portion of mounting screw 50 therein. As will be appreciated by those skilled in the art, assembled pilot body 10 can also be installed in an upper pressure pad or other die component machined as outlined below, with the pressure pad 3 and/or die member oriented in the run condition shown in FIGS. 1 and 29.

The pilot assembly 1 is aligned with and inserted into the pilot hole 80 in die member 3 in the manner illustrated in FIGS. 34-35. The pilot body 10 is rotated in pilot hole 80, so that one of three fastener reliefs 19 in pilot body 10 is laterally aligned with the threaded screw aperture 85 in the mounting face 8 of die member 3, as shown in FIG. 35. Mounting screw 50, with lock washer 31 installed on the shank portion 53 of mounting screw 50, is then inserted into the threaded retainer aperture 85 in upper die pad member 3, as shown in FIGS. 35 and 36. The tightening of mounting screw 50 in the mounting screw aperture 85 in the die member 3 abuttingly engages at least a portion of the inner face 73 of the lock washer 71 on mounting screw 50 securely against the relief end surface 21 of the aligned fastener relief 19 in the pilot body 10, as shown in FIGS. 1, 36, to securely, yet detachably mount the pilot assembly 1 on the die member 3 in a manner which causes the ejector pins 42 to automatically reciprocate between the retracted and extended positions relative to the pilot body 10 during operation of the metal forming die to ensure that the stock strip 5 is consistently and fully stripped away from the pilot body 10. As will be appreciated by those skilled in the art, under special and/or abnormal conditions, multiple mounting screws 50 may be used to secure pilot body 10 in die member 3. Essentially, the full cylindrical portions of the pilot body 10, when closely received in the pilot hole 80 of die pressure pad 3, precisely locate and support the pilot body 10 in the die workstation 102, and the single mounting screw 50 securely, yet detachably retains the pilot assembly 1 in pilot hole 80.

The pilot body 10 and related pilot assembly 1 may be readily removed from die member 3 by simply reversing the sequence of the installation steps described above. In the illustrated example, a puller tool 66 (FIG. 36) is provided to facilitate safe removal and handling of the pilot assembly 1. More specifically, puller tool 66 has a threaded outer end 66a that is threadedly engaged in the threaded aperture 65 in pilot body portion 15, and a weighted sliding handle 66b which is manually shifted outwardly along the rod shaped body of puller tool 66 to impact an enlarged head 66c, thereby imparting sufficient outwardly directed forces to easily extract pilot body 10 from the pilot hole 80 in die member 3. Alternatively, pilot body 10 can be removed from die member 3 by tapping it out of pilot hole 80 with a punch and hammer applied from the outer end of pilot body 10.

FIGS. 29-31 illustrate the operation of the pilot assembly 1, wherein FIG. 29 illustrates the upper die member 3 with pilot assembly 1 mounted therein converging against the stock strip 5 that is supported on the upper surface 9 of the lower die member 4. In this position, the ejector pins 42 are fully extended, and just start to abut against the upper surface of the stock strip 5. The outer portion 26 of the point portion 24 of pilot insert 23 is received through the most closely aligned one of the pilot holes 6 in stock strip 5 and into the female pilot portion 90 in the bottom or lower die member 4, but the collar portion of pilot body 10 is not. Next, the upper die member 3 converges or closes completely against the stock strip 5 and lower die member 4 supporting the same in the manner illustrated in FIG. 30, such that the abutting contact between the outer ends 43 of the ejector pins 42 and the upper surface of the stock strip 5 overcomes the biasing force of pre-tensed spring member 35 on ejector pins 42, further compresses spring member 35, and shifts or retracts the ejector pins 42 back toward the interior of the pilot body 10. As shown in FIG. 30, the collar portion 25 of the point portion 24 of pilot insert 23 can be received in the female pilot portion 90 of bottom die member 4. The metal forming operation at the associated die work station 12 is then completed with the pilot assembly 1 in the position shown in FIG. 30, such that the stock strip 5 is precisely located and securely held in place during formation and further processing of stock strip 5. As the upper die member 3 diverges or moves away from the stock strip 5 and lower die member 4 (FIG. 31), the resilient forces generated by spring member 35 urge the ejector pins 42 back outwardly toward the stock strip 5 and separate or strip the stock strip 5 from the pilot, even when it sticks on the outer surfaces of the nose portion of the pilot insert 23, such that the stock strip 5 can then be quickly shifted longitudinally to the next work station 12 for further processing.

It is also possible to mount pilot assembly 1 in an associated die member by forming a blind hole pocket in the die member, instead of the through hole mounting aperture 80. The pilot assembly 1 is inserted into the blind hole pocket and retained therein using a single fastener. With this alternate mounting arrangement, the retainer groove 33 on pilot insert 23 and retainer ring 47 can be eliminated by using the bottom surface of the pocket to retain an inner end of the spring member 35, as will be appreciated by those skilled in the art.

As will be appreciated by those skilled in the art, pilot assembly 1 can be provided in a wide variety of sizes to accommodate many different metal forming die applications. The all-in-one, modular construction of pilot assembly 1 not only provides a self-contained stock stripper that uses only one spring, but can be quickly and easily installed directly in a die member using simple machining techniques, and a single mounting screw.

Pilot assembly 1 has an uncomplicated construction with relatively few components and is therefore quite durable and economical to manufacture. The single mounting screw attachment of the pilot assembly to an associated die member provides quick and easy installation and removal. Pilot assembly 1 has a self-contained stripper which positively separates the stock strip from the pilot during operation of the metal forming die, and provides a very compact, low profile shape that can be used at various locations and orientations on the various die members. The installation of the pilot assembly 1 can be achieved with simple machining, so as to reduce installation time and cost.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. In a multi-station progressive metal forming die having at least two mutually converging and diverging die members between which an elongate stock strip is shifted longitudinally to form parts from the stock strip, the improvement of a modular pilot assembly with self-contained stripper for precisely locating the stock strip in the die stations, comprising:
    a pilot body operably supported on one of said die members and having a generally cylindrical shape with an outer end portion oriented toward the stock strip, an oppositely disposed inner end portion oriented away from the stock strip, and a central aperture extending through said outer and inner end portions, and wherein;
    said outer end portion of said pilot body has an outer end surface oriented toward the stock strip, an inner end surface oriented away from the stock strip, and an outer sidewall with a least one fastener relief therein having an arcuately shaped, radially inwardly curved relief sidewall that extends axially from said outer end surface to a relief end surface facing toward the stock strip and spaced axially outwardly a predetermined distance from said inner end surface, as well as at least one axially oriented ejector pin aperture which extends through said outer end surface and opens generally to said inner end surface; and said inner end portion of the pilot body has a generally annularly shaped spring retainer collar, with an outer end oriented toward the stock strip, an inner end oriented away from the stock strip, and an outer sidewall with a diameter that is less than the diameter of said outer sidewall of said outer end portion of said pilot body;

a pilot insert having at least a portion thereof shaped for press fit reception in said central aperture of said pilot body in an assembled condition, and including a circularly shaped innermost collar portion disposed adjacent said outer end surface of said pilot body when in said assembled condition and shaped for close reception in a pilot hole in the stock strip, a generally tapered outer portion configured to engage the pilot hole in the stock strip and guide the stock strip to a predetermined position in an associated die forming station, and a base portion positioned opposite said tapered outer portion;

at least one rigid ejector pin slidingly received and retained in said ejector pin aperture in said pilot body, having an inner end oriented away from the stock strip and an outer end oriented toward the stock strip and protruding outwardly from said outer end surface of said outer end portion of said pilot body when urged to an extended position to contact the stock strip and strip the same away from said pilot insert, and retracting inwardly toward said pilot body when urged to a retracted position;

a spring member having a generally hollow interior that is received onto and over said spring retainer collar on said inner end portion of said pilot body, an outer end oriented toward the stock strip and operably engaging said inner end of said ejector pin to bias said ejector pin outwardly to said extended position, and an inner end oriented away from the stock strip and positioned adjacent to said base portion of said pilot insert in said assembled condition;

a retainer operably connected with said base portion of said pilot insert, and engaging said inner end of said spring member to retain said spring member in a pre-tensed condition on said spring retainer collar when in said assembled condition to resiliently urge said ejector pin to said extended position; and a mounting screw having an enlarged head portion with a circular plan shape that is at least partially, closely received in said fastener relief in said outer end portion of said pilot body, an annularly shaped inner face oriented away from the stock strip and abuttingly engaging said relief end surface of said fastener relief in said outer end portion of said pilot body, and a threaded shank portion anchored in said one die member to securely, yet detachably mount said pilot assembly on said one die member in a manner which causes said ejector pin to automatically reciprocate between said retracted and extended positions relative to said pilot body during operation of said metal forming die to insure that the stock strip is consistently stripped away from said pilot insert.

2. A metal forming die as set forth in claim 1, wherein:
said pilot body includes a plurality of said fastener reliefs having a substantially identical configuration and arranged in a circumferentially spaced apart pattern around said outer sidewall of said body portion to facilitate mounting said pilot assembly at various locations and orientations on said one die member.

3. A metal forming die as set forth in claim 2, wherein:
said mounting screw comprises a single mounting screw configured for at least partial reception in and engagement with any one of said fastener reliefs in said pilot body which provides the sole support for mounting said pilot assembly in said one die member, with a compact footprint that facilitates ease of die design and pilot installation.

4. A metal forming die as set forth in claim 3, wherein:
said pilot body has a one-piece construction formed from a solid bar of rigid material.

5. A metal forming die as set forth in claim 4, wherein:
said pilot body includes a plurality of said ejector pin apertures having a substantially identical configuration and arranged in a circumferentially spaced apart, mutually parallel, axially extending pattern through said pilot body to insure effective stripping of the stock strip from said pilot; and including
a plurality of said ejector pins having a substantially identical configuration and slidingly received and retained in said ejector pin apertures in said pilot body.

6. A metal forming die as set forth in claim 5, wherein:
said outer ends of said ejector pins selectively project from said ejector pin apertures in said pilot body at locations immediately adjacent said pilot insert to insure effective stripping of the stock strip from said pilot.

7. A metal forming die as set forth in claim 6, wherein:
said outer ends of said ejector pins have a flat, generally circular plan shape to facilitate stripping the stock strip from said pilot assembly; and
said inner ends of said ejector pins have a flat, generally circular plan shape to facilitate abutting engagement with said outer end of said spring member.

8. A metal forming die as set forth in claim 7, wherein:
said pilot body includes a threaded blind installation aperture extending axially into outer end of said pilot body at a location spaced radially apart from said ejector pin apertures; and including
a threaded tool configured for threaded engagement in said blind installation aperture to facilitate installation and removal of said pilot assembly from said one die member.

9. A metal forming die as set forth in claim 8, wherein:
said installation aperture is disposed in said body portion of said pilot at a location generally circumferentially opposite said fastener reliefs.

10. A metal forming die as set forth in claim 9, including:
a lock washer having a generally annular plan shape with an outer sidewall shaped for at least partial, close reception in any one of said fastener reliefs, and an inside sidewall shaped for close reception of said shank portion of said mounting screw therethrough.

11. A metal forming die as set forth in claim 10, wherein:
said one die member has a mounting face with a cylindrically shaped, non-threaded pilot aperture therein in which said pilot body is closely received to accurately locate said pilot assembly on said one die member.

12. A metal forming die as set forth in claim 11, wherein:
said mounting face of said one die member includes a threaded mounting screw aperture therein spaced laterally from said pilot aperture a predetermined distance in which said mounting screw is threadedly anchored.

13. A metal forming die as set forth in claim 12, wherein: said lock washer comprises a split high collar lock washer.

14. A metal forming die as set forth in claim 13, wherein: said mounting screw comprises a cap screw.

15. A metal forming die as set forth in claim 14, wherein: said threaded shank portion of said cap screw includes a self-locking pad to prevent inadvertent removal from said one die member.

16. A metal forming die as set forth in claim 15, wherein: said one die member comprises a reciprocating die pad.

17. A metal forming die as set forth in claim 16, wherein: said pilot body and said pilot insert are arranged in a generally concentric relationship.

18. A metal forming die as set forth in claim 1, wherein: said mounting screw comprises a single mounting screw configured for partial reception in and engagement with said fastener relief in said pilot body which provides the sole support for mounting said pilot body in said one die member.

19. A metal forming die as set forth in claim 1, wherein: said pilot insert has a one-piece construction formed from a solid bar of rigid and hardened material.

20. A modular pilot assembly with self-contained stripper for multi-station progressive metal forming dies having at least two mutually converging and diverging die members between which an elongate stock strip is shifted longitudinally to form parts from the stock strip, comprising:
  a pilot body configured for operable support on an associated die member, and having a generally cylindrical shape with an outer end portion oriented toward the stock strip, an oppositely disposed inner end portion oriented away from the stock strip, and a central aperture extending through said outer and inner end portions, and wherein;
    said outer end portion of said pilot body has an outer end surface oriented toward the stock strip, an inner end surface oriented away from the stock strip, and an outer sidewall with a least one fastener relief therein having an arcuately shaped, radially inwardly curved relief sidewall that extends axially from said outer end surface to a relief end surface facing toward the stock strip and spaced axially outwardly a predetermined distance from said inner end surface, as well as at least one axially oriented ejector pin aperture which extends through said outer end surface and opens generally to said inner end surface; and
    said inner end portion of the pilot body has a generally annularly shaped spring retainer collar, with an outer end oriented toward the stock strip, an inner end oriented away from the stock strip, and an outer sidewall with a diameter that is less than the diameter of said outer sidewall of said outer end portion of said pilot body;
  a pilot insert having at least a portion thereof shaped for press fit reception in said central aperture of said pilot body in an assembled condition, and including a circularly shaped innermost collar portion disposed adjacent said outer end surface of said pilot body when in said assembled condition and shaped for close reception in a pilot hole in the stock strip, a generally tapered outer portion configured to engage the pilot hole in the stock strip and guide the stock strip to a predetermined position in an associated die forming station, and a base portion positioned opposite said tapered outer portion;
  at least one rigid ejector pin slidingly received and retained in said ejector pin aperture in said pilot body, having an inner end oriented away from the stock strip and an outer end oriented toward the stock strip and protruding outwardly from said outer end surface of said outer end portion of said pilot body when urged to an extended position to contact the stock strip and strip the same away from said pilot insert, and retracting inwardly toward said pilot body when urged to a retracted position;
  a spring member having a generally hollow interior that is received onto and over said spring retainer collar on said inner end portion of said pilot body, an outer end oriented toward the stock strip, and operably engaging said inner end of said ejector pin to bias said ejector pin outwardly to said extended position, and an inner end oriented away from the stock strip and positioned adjacent to said base portion of said pilot insert in said assembled condition;
  a retainer operably connected with said base portion of said pilot insert, and engaging said inner end of said spring member to retain said spring member in a pre-tensed condition on said spring retainer collar when in said assembled condition to resiliently urge said ejector pin to said extended position; and
  a mounting screw having an enlarged head portion with a circular plan shape that is at least partially, closely received in said fastener relief in said outer end portion of said pilot body, an annularly shaped inner face oriented away from the stock strip and abuttingly engaging said relief end surface of said fastener relief in said outer end portion of said pilot body, and a threaded shank portion shaped for anchoring in the associated die member to securely, yet detachably mount said pilot assembly on the associated die member in a manner which causes said ejector pin to automatically reciprocate between said retracted and extended positions relative to said pilot body during operation of the metal forming die to insure that the stock strip is consistently stripped away from said pilot insert.

21. A modular pilot assembly as set forth in claim 20, wherein:
  said pilot body includes a plurality of said fastener reliefs having a substantially identical configuration and arranged in a circumferentially spaced apart pattern around said outer sidewall of said pilot body to facilitate mounting said pilot assembly at various locations and orientations on the associated die member.

22. A modular pilot assembly as set forth in claim 21, wherein:
  said mounting screw comprises a single mounting screw configured for at least partial reception in and engagement with any one of said fastener reliefs in said pilot body which provides the sole support for mounting said pilot assembly in the associated die member, with a compact footprint that facilitates ease of die design and pilot installation.

23. A modular pilot assembly as set forth in claim 22, wherein:
  said pilot body has a one-piece construction formed from a solid bar of rigid material.

24. A modular pilot assembly die as set forth in claim 23, wherein:
  said pilot body includes a plurality of said ejector pin apertures having a substantially identical configuration and arranged in a circumferentially spaced apart, mutually parallel, axially extending pattern through said pilot body to insure effective stripping of the stock strip from said pilot assembly; and including
a plurality of said ejector pins having a substantially identical configuration and slidingly received and retained in said ejector pin apertures in said pilot body.

26. A modular pilot assembly as set forth in claim 24, wherein:
said outer ends of said ejector pins selectively project from said ejector pin apertures in said pilot body at locations immediately adjacent said pilot insert to insure effective stripping of the stock strip from said pilot assembly.

26. A modular pilot assembly as set forth in claim 25, wherein:
said outer ends of said ejector pins have a flat, generally circular plan shape to facilitate stripping the stock strip from said pilot assembly; and
said inner ends of said ejector pins have a flat, generally circular plan shape to facilitate abutting engagement with said outer end of said spring member.

27. A modular pilot assembly as set forth in claim 26, wherein:
said pilot body includes a threaded blind installation aperture extending axially into said closed outer end of said pilot body at a location spaced radially apart from said ejector pin apertures; and including
a threaded tool configured for threaded engagement in said blind installation aperture to facilitate installation and removal of said pilot assembly from the associated die member.

28. A modular pilot assembly as set forth in claim 27, wherein:
said installation aperture is disposed in said pilot body at a location generally circumferentially opposite said fastener reliefs.

29. A modular pilot assembly as set forth in claim 28, including:
a lock washer having a generally annular plan shape with an outer sidewall shaped for at least partial close reception in any one of said fastener reliefs, and an inside sidewall shaped for close reception of said shank portion of said mounting screw therethrough.

30. A modular pilot assembly as set forth in claim 29, wherein:
said lock washer comprises a split high collar lock washer; and
said mounting screw comprises a cap screw.

31. A modular pilot assembly as set forth in claim 30, wherein said mounting screw comprises a cap screw with a self-locking pad on said threaded shank portion thereof.

32. A modular pilot assembly as set forth in claim 20, wherein said pilot insert has a one-piece construction formed form a solid bar of rigid and hardened material.

33. In a method for making a multi-station progressive metal forming die having at least two mutually converging and diverging die members between which an elongate stock strip is shifted longitudinally to form parts from the stock strip, with the improvement of at least one modular pilot with self-contained stripper for precisely locating the stock strip in the die stations, comprising:
forming a pilot body for operable support on one of the die members with a generally cylindrical shape having an outer end portion oriented toward the stock strip, an oppositely disposed inner end portion oriented away from the stock strip, and a central aperture extending through the outer and inner end portions, and including;
forming the outer end portion of the pilot sleeve with an outer end surface oriented toward the stock strip, an inner end surface oriented away from the stock strip, and an outer sidewall with a least one fastener relief therein having an arcuately shaped, radially inwardly curved relief sidewall that extends axially from the outer end surface to a generally flat arcuately shaped relief end surface facing toward the stock strip and spaced axially outwardly a predetermined distance from the inner end surface, as well as at least one axially oriented ejector pin aperture which extends through the outer end surface and opens generally to the inner end surface; and
forming the inner end portion of the pilot body with a generally annularly shaped spring retainer collar, having an outer end oriented toward the stock strip, an inner end oriented away from the stock strip, and an outer sidewall with a diameter that is less than the diameter of the outer sidewall of the outer end portion of the pilot body;
forming a rigid pilot insert with a medial portion shaped for close reception in the central aperture of the pilot body in an assembled condition, a tapered outer portion configured to engage the pilot hole in the stock strip and guide the stock strip to a predetermined position in an associated one of the die forming stations, and an inner base portion positioned opposite the tapered outer portion;
hardening the pilot insert prior to assembly in the pilot body;
press fitting the hardened pilot insert into the central aperture of the pilot body such that the tapered outer portion of the pilot insert protrudes outwardly from the outer end surface of the outer end portion of the pilot body to define an assembled condition;
forming at least one rigid ejector pin with an inner end, and an outer end configured to protrude outwardly from the outer end surface of the outer end portion of the pilot body when urged to an extended position to contact the stock strip, and to retract toward the pilot body when urged to a retracted position;
inserting the ejector pin into the ejector pin aperture in the pilot body, such that the ejector pin is slidingly received and retained in the ejector pin aperture for longitudinal reciprocation therein between the extended and retracted positions;
selecting a spring member with a generally hollow interior, an outer end oriented toward the stock strip, and an opposite inner end oriented away from the stock strip;
positioning the hollow interior of the spring member onto and over the spring retainer collar of the inner end portion of the pilot body, with the outer end of the spring member abutting the inner end of the ejector pin, and the inner end of the spring member protruding inwardly away from the outer end portion of the pilot sleeve;
operably connecting a retainer with the base portion of the pilot insert at a location thereon which engages the retainer with the inner end of the spring member and retains the spring member in a pre-tensed condition on the spring retainer collar in an assembled condition to resiliently urge the ejector pin to the extended position;
forming a non-threaded, blind hole pocket in a mounting face of one of the die members with a cylindrical sidewall shaped to closely receive and retain at least the outer end portion of the pilot body therein;
forming a threaded mounting screw aperture in the mounting face of the one die member at a location spaced laterally apart from the pilot pocket a predetermined distance;

inserting the pilot in the assembled condition into the pilot pocket in the one die member with at least the outer sidewall of the outer end portion of the pilot body closely received therein, so as to accurately locate the pilot on the one die member, and with the fastener relief in the pilot body facing and aligned with the mounting screw aperture in the one die member;

selecting a mounting screw having an enlarged head portion with a circular plan shape sized for close reception of at least a portion thereof in the fastener relief in the pilot body, an annularly shaped inner face sized for abutting engagement with at least a portion of the relief end surface of the fastener relief in the pilot body, and a threaded shank portion;

inserting the threaded shank portion of the mounting screw axially into the mounting screw aperture in the mounting face of the one die member, such that at least a portion of the enlarged head portion of the mounting screw is closely received in the fastener relief and adjacent the relief sidewall on the outer end portion of the pilot body; and tightening the mounting screw in the mounting screw aperture in the one die member, thereby abuttingly engaging the inner face of the mounting screw head portion securely against the relief end surface of the fastener relief in the outer end portion of the pilot body to securely, yet detachably mount the pilot on the one die member in a manner which causes the ejector pin to automatically reciprocate between the retracted and extended positions relative to the pilot body during operation of the metal forming die to insure that the stock strip is consistently stripped away from the pilot insert.

34. A method as set forth in claim 33, wherein:
said body portion forming step comprises forming a plurality of the fastener reliefs in said pilot body with a substantially identical configuration and arranging the same in a circumferentially spaced apart pattern around the outer sidewall of said pilot body to facilitate mounting the pilot assembly at various locations and orientations on the one die member.

35. A method as set forth in claim 33, wherein:
said mounting screw selecting step comprises using a single mounting screw to mount the pilot body in the one die member to provide a compact footprint that facilitates ease of die design and pilot installation.

36. A method as set forth in claim 33, wherein:
said pilot body forming steps include forming the pilot body from a solid bar of rigid material to provide a precise one-piece construction.

37. A method as set forth in claim 33, wherein:
said pilot body forming steps include forming the outer end, inner end and medial portions of the pilot body from a solid bar of rigid material in a single set up machining process to improve accuracy of the pilot and reduce manufacturing costs.

38. A method as set forth in claim 33, wherein:
said pilot body forming step comprises forming a plurality of the ejector pin apertures in the pilot body with a substantially identical configuration and arranging the same in a circumferentially spaced apart, mutually parallel, axially extending pattern through the pilot body to insure effective stripping of the stock strip from the pilot assembly; and
said ejection pin forming step comprises forming a plurality of the ejector pins with a substantially identical configuration and slidingly inserting the same in said ejector pin apertures in the pilot body.

39. A method as set forth in claim 33, wherein:
said pilot insert forming a step includes forming the pilot insert from a solid bar of rigid material that is different material than used for forming the pilot body.

40. A method as set forth in claim 33, wherein:
said pilot body forming step includes forming a threaded blind installation aperture axially into the outer end of said pilot body at a location spaced radially apart from said ejector pin apertures to facilitate installation and removal of the pilot assembly from the one die member using a tool.

* * * * *